(12) United States Patent
Bowman et al.

(10) Patent No.: US 11,299,356 B1
(45) Date of Patent: *Apr. 12, 2022

(54) PRODUCT PURCHASE SYSTEM INCLUDING PRODUCT RETRIEVAL ROBOT OF ADD-ON PRODUCT BASED UPON MOBILE DEVICE AND RELATED METHODS

(71) Applicant: Inmar Clearing, Inc., Winston-Salem, NC (US)

(72) Inventors: Jacob Bowman, High Point, NC (US); Melissa Bube, High Point, NC (US); Joel Corra, Winston-Salem, NC (US); Jason Eudy, Pinnacle, NC (US)

(73) Assignee: INMAR CLEARING, INC., Winston-Salem, NC (US)

( * ) Notice: Subject to any disclaimer, the term of this patent is extended or adjusted under 35 U.S.C. 154(b) by 213 days.

This patent is subject to a terminal disclaimer.

(21) Appl. No.: 16/574,430

(22) Filed: Sep. 18, 2019

(51) Int. Cl.
*B65G 47/90* (2006.01)
*G06Q 30/02* (2012.01)
(Continued)

(52) U.S. Cl.
CPC ......... *B65G 47/905* (2013.01); *G06Q 20/208* (2013.01); *G06Q 30/0238* (2013.01);
(Continued)

(58) Field of Classification Search
CPC ....... G06Q 30/02–0277; G06Q 20/208; G06Q 30/0635; B65G 47/905; G05B 2219/50391; G06K 7/10297
See application file for complete search history.

(56) References Cited

U.S. PATENT DOCUMENTS 9,796,093 B2    10/2017   Mascorro Medina et al.
10,180,683 B1    1/2019   Libman et al.
(Continued)

FOREIGN PATENT DOCUMENTS

CA         2700629 A1 * 11/2011 ......... G06Q 30/0241

OTHER PUBLICATIONS

Murakawa, Y. Okabayashi, K. Kanda, S. Ueki, "Verification of the effectiveness of Robots for Sales Promotion in Commercial Facilities", Dec. 1, 2011, 2011 IEEE/SICE International Symposium on System Integration (SII) (pp. 299-305) (Year: 2011).*

(Continued)

*Primary Examiner* — Raquel Alvarez
(74) *Attorney, Agent, or Firm* — Allen, Dyer, Doppelt + Gilchrist, P.A. Attorneys at Law

(57) ABSTRACT

A product purchase system may include a product retrieval robot for a physical store and a mobile wireless communications device associated with a given user and configured to obtain product identifying data for a given product for purchase in the physical store. The given product for purchase may be placed by the given user into a physical shopping cart. The system may also include a server configured to identify the given product for purchase based upon the product identifying data, and determine an add-on product associated with the given product for purchase and located in the physical store. The product retrieval robot may be configured to cooperate with the server to retrieve the add-on product from the physical store and deliver the add-on product to the physical shopping cart.

29 Claims, 8 Drawing Sheets

(51) Int. Cl.
*G06Q 30/06* (2012.01)
*G06Q 20/20* (2012.01)
*G06K 7/10* (2006.01)

(52) U.S. Cl.
CPC .............. *G06Q 30/0635* (2013.01); *G05B 2219/50391* (2013.01); *G06K 7/10297* (2013.01)

(56) References Cited

U.S. PATENT DOCUMENTS

| | | |
|---|---|---|
| 10,223,710 B2 | 3/2019 | Purves et al. |
| 2004/0217166 A1* | 11/2004 | Myers ................. G07G 1/00 235/383 |
| 2008/0249865 A1* | 10/2008 | Angell ............... G06Q 30/06 705/14.34 |
| 2018/0158016 A1* | 6/2018 | Pandya ............ G05B 19/41895 |
| 2018/0354139 A1* | 12/2018 | Wang ............... G06Q 30/0635 |

OTHER PUBLICATIONS

Bowman et al., U.S. Appl. No. 16/574,445, filed Sep. 18, 2019.

* cited by examiner

PRODUCT PURCHASE SYSTEM INCLUDING PRODUCT RETRIEVAL ROBOT OF ADD-ON PRODUCT BASED UPON MOBILE DEVICE AND RELATED METHODS

TECHNICAL FIELD

The present invention relates to the field of product purchasing systems, and more particularly, to robot retrieval of products for purchase and related methods.

BACKGROUND

Shopping for food items may include the use of a shopping cart. A physical shopping cart permits the shopper to add merchandise or food items inside the cart for the shopper to transport the food items within a store. The shopper may transport the physical shopping cart between desirable food item locations within the store and physically remove a desired food item from a shelf for placement within the physical shopping cart. A shopper may checkout of the store by transporting the physical shopping cart including its contents to a checkout area where the food items or merchandise are scanned or processed for checkout.

A robot is a machine that may be programmed to perform desired activities that may be typically performed by humans. For example, some robots may perform manufacturing or assembly operations. Other robots may perform operations that may be considered relatively dangerous to humans. Still further, other robots may assist humans in commerce, for example, stock keeping, packaging, and warehouse operations.

U.S. Pat. No. 9,796,093 to Medina et al. discloses a robot taking pictures of products in a basket, a shopping cart, and hands of a customer. The robot can send all these pictures to the computing center and the computing center can process these pictures, recognize and differentiate the products, calculate how many products are left on a display structure, report the misplaced products that should not be placed on the structure, and update all this information in the inventory database. When there are misplaced products, or when the amount of a certain product is lower than a warning threshold pre-set in the inventory database, the robot may send a warning message to the system backend software so that the facility manager or agent can make arrangements to put away the misplaced products and/or refill the products on the structure.

U.S. Pat. No. 10,180,683 to Libman et al. discloses a shopping cart at the supermarket that integrates the robotic platform that can integrate techniques that can process and determine a user's habits (e.g., in real time) and also generate and provide offers, e.g., of products complementary to the ones that he has already chosen (e.g., by sending the offer to the user's device, e.g., within the app referenced herein and/or a third party app). In certain implementations the shopping cart can also be configured to lead the user to a product that he is looking for.

U.S. Pat. No. 10,223,710 to Purves et al. discloses robots that may be able to physically shop/select/package items for user delivery/pickup. Despite developments in the area of robotics to assist with shopping, further improvements and innovations are still desirable.

SUMMARY

A product purchase system may include a product retrieval robot for a physical store and a mobile wireless communications device associated with a given user and configured to obtain product identifying data for a given product for purchase in the physical store. The given product for purchase may be placed by the given user into a physical shopping cart. The system may also include a product purchase server configured to identify the given product for purchase based upon the product identifying data, and determine an add-on product associated with the given product for purchase and located in the physical store. The product retrieval robot may be configured to cooperate with the product purchase server to retrieve the add-on product from the physical store and deliver the add-on product to the physical shopping cart.

The product purchase server may be configured to generate and communicate a digital promotion for the add-on product. The product purchase server may be configured to generate and communicate a digital promotion for the given product, for example.

The product identifying data may include product image data. The product purchase server may be configured to identify the given product for purchase based upon image recognition of the product image data, for example.

The product identifying data may include uniform product code (UPC) data. The product identifying data may include radio frequency identifying tag data, for example.

The product retrieval robot may include a ground robot, for example. The product retrieval robot may include a drone.

The mobile wireless communications device may include a camera and a controller cooperating therewith to obtain the product identifying data, for example. The product purchase system may include a scan check-out device at the physical store configured to complete a purchase, for example.

A method aspect is directed to a method of processing a product purchase. The method may include using a product purchase server to identify a given product for purchase in a physical store based upon product identifying data obtained from a mobile wireless communications device associated with a given user. The given product for purchase may be placed by the given user into a physical shopping cart. The method may also include using the processor to determine an add-on product associated with the given product for purchase and located in the physical store, and to cooperate with a product retrieval robot in the physical store so that the product retrieval robot retrieves the add-on product from the physical store and delivers the add-on product to the physical shopping cart.

A computer readable medium aspect is directed to a non-transitory computer readable medium for processing a product purchase. The non-transitory computer readable medium includes computer executable instructions that when executed by a processor cause the processor to perform operations. The operations may include identifying a given product for purchase in a physical store based upon product identifying data obtained from a mobile wireless communications device associated with a given user. The given product for purchase may be placed by the given user into a physical shopping cart. The operations may also include determining an add-on product associated with the given product for purchase and located in the physical store, and cooperating with a product retrieval robot so that the product retrieval robot retrieves the add-on product from the physical store and delivers the add-on product to the physical shopping cart.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
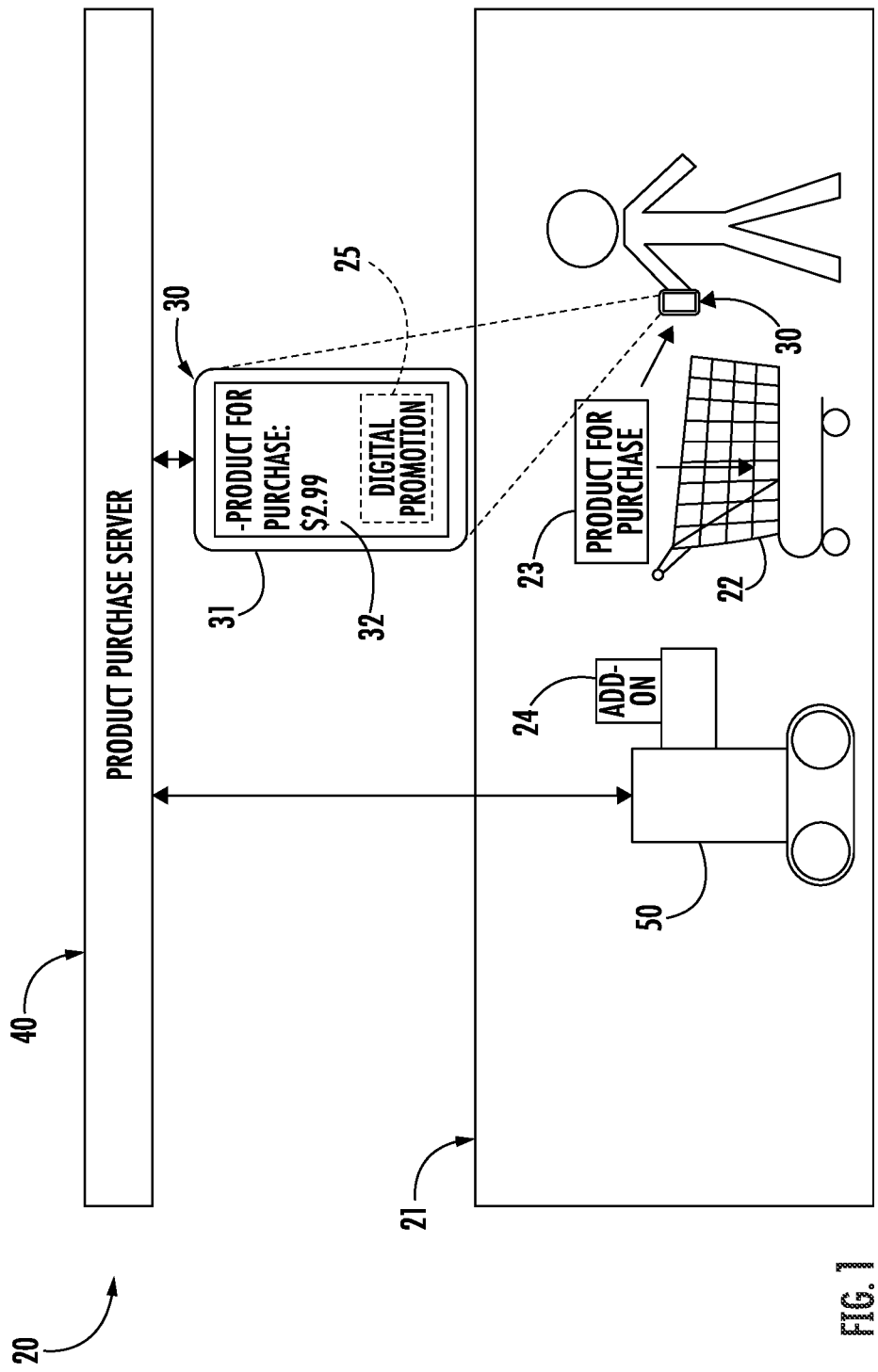
FIG. 1 is a schematic diagram of a product purchase system in accordance with an embodiment.
Figure 2:
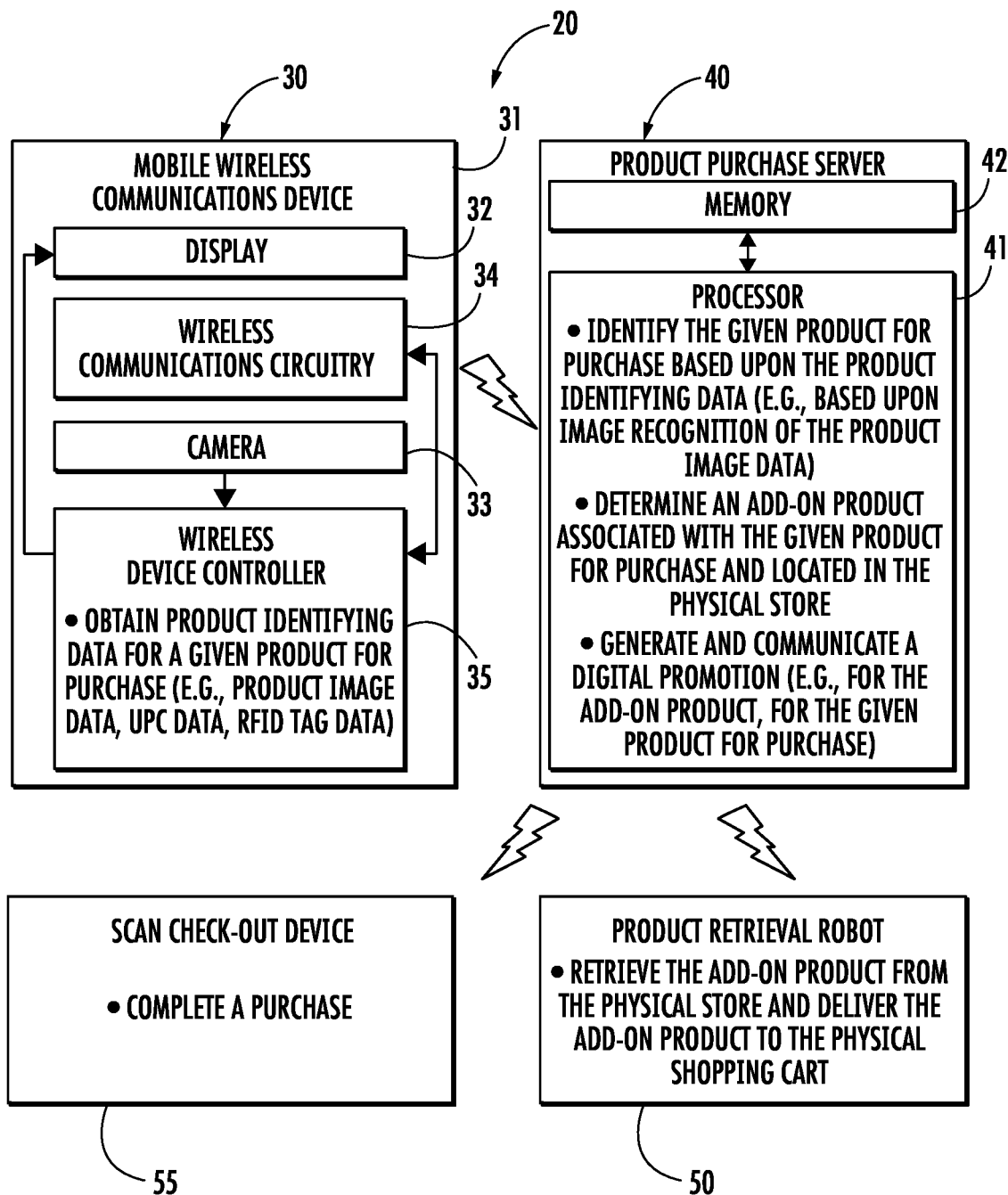
FIG. 2 is a schematic block diagram of the product purchase system of FIG. 1.

Referring initially to FIGS. 1-2, a product purchase system 20 includes a mobile wireless communications device 30 associated with a given user. The mobile wireless communications device 30 includes a housing 31, a display 32 carried by the housing, and a camera 33 also carried by the housing. The display 32 may be in the form of a touch display, as will be appreciated by those skilled in the art. The mobile wireless communications device 30 also includes wireless communications circuitry 34 and a wireless device controller 35 coupled to the wireless communications circuitry. The wireless communications circuitry 34 may include any one or more of cellular circuitry, WiFi circuitry, near field communications (NFC) circuitry, and/or any other short or long range wireless communications circuitry.

The display 32 and camera 33 are also coupled to the wireless device controller 35. While a mobile wireless communications device 30 is illustrated and described, the mobile wireless communications device be in the form of a personal computer, laptop computer, tablet computer, or wearable device.

The wireless communications device 30, by way of the wireless device controller 35 and either or both of the camera 33 and wireless communications circuitry 34, as will be described in further detail below, obtains product identifying data for a given product for purchase 23 in the physical store 21 (e.g., through an application). The given product for purchase 23 is to be placed by the given user into a physical shopping cart 22. The product identifying data may be an image of the product, for example, a photo of the product captured by the camera 33. The product identifying data may include uniform product code (UPC) data, for example, a UPC code of the product captured by the camera 33 or other scanner of the mobile wireless communications device 30. The product identifying data may include radio frequency identifying (RFID) tag data, for example, communicated via RFID tags carried by the product and communicated using the wireless communications circuitry (e.g., NFC). In other words, the mobile wireless communications device 30 may not include a camera. Of course, the product identifying data may include more than one of the above-described data types.

The given user may photograph, scan, or simply move the given product 23 to the physical cart 22 when the given user is desirous of purchasing the given product. Thus, a virtual shopping cart or listing of products in the physical shopping cart 22 may be maintained, as will be appreciated by those skilled in the art.

The product purchase system 20 also includes a product purchase server 40. The product purchase server 40 includes a processor 41 and an associated memory 42. While operations of the product purchase server 40 are described herein, it should be appreciated that the operations are performed based upon cooperation between the processor 41 and the memory 42.

Figure 3:
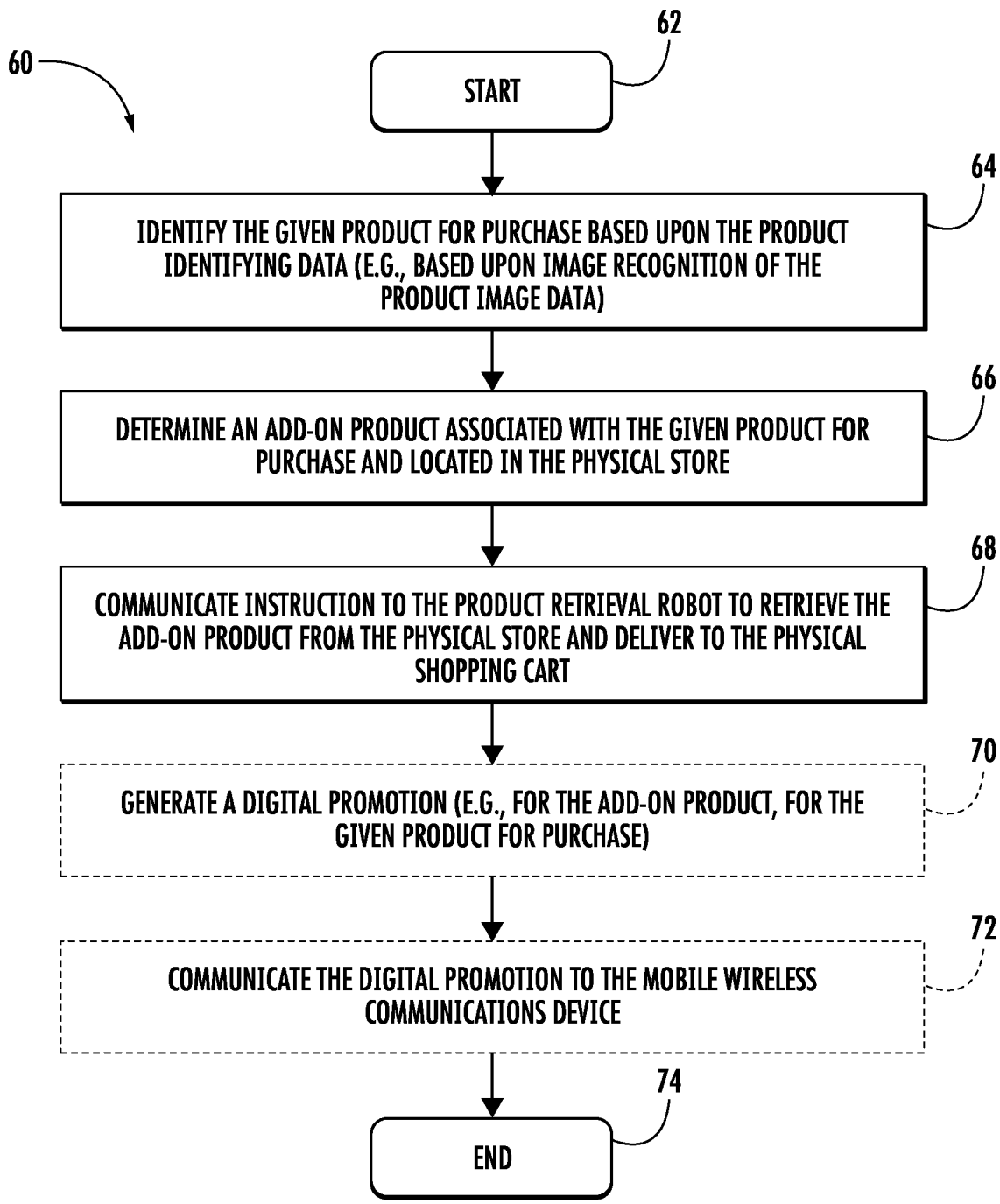
FIG. 3 is a flow diagram illustrating operation of the product purchase server in accordance with an embodiment.

Referring now to the flowchart 60 in FIG. 3, beginning at Block 62, operations of the product purchase server 40 will now be described. At Block 64, the product purchase server 40 identifies the given product for purchase 23 based upon the product identifying data. In other words, the product purchase server 40 may use image recognition of product image data when the product identifying data is in the form of product image data. The product purchase server 40 may perform a lookup of a scanned UPC to identify the given product 23. The product purchase server may alternatively or additionally identify the given product 23 based upon the corresponding RFID tag.

At Block 66, the product purchase server 40 determines an add-on product 24 associated with the given product for purchase 23. The add-on product 24 is also in the physical store 21. The add-on product 24 may be considered a companion product, for example, if peanut butter is added to the physical shopping cart 22, the add-on product may be jelly. In another example, if soda is added to the physical shopping cart 22, the add-on product 24 may be chips or pretzels. The add-on product 24 may be the same or different brand as the given product for purchase 23.

The product purchase system 20 also includes a product retrieval robot 50 that is for a physical or brick-and-mortar store 21. The product retrieval robot 50 is illustratively a ground robot.

Figure 4:
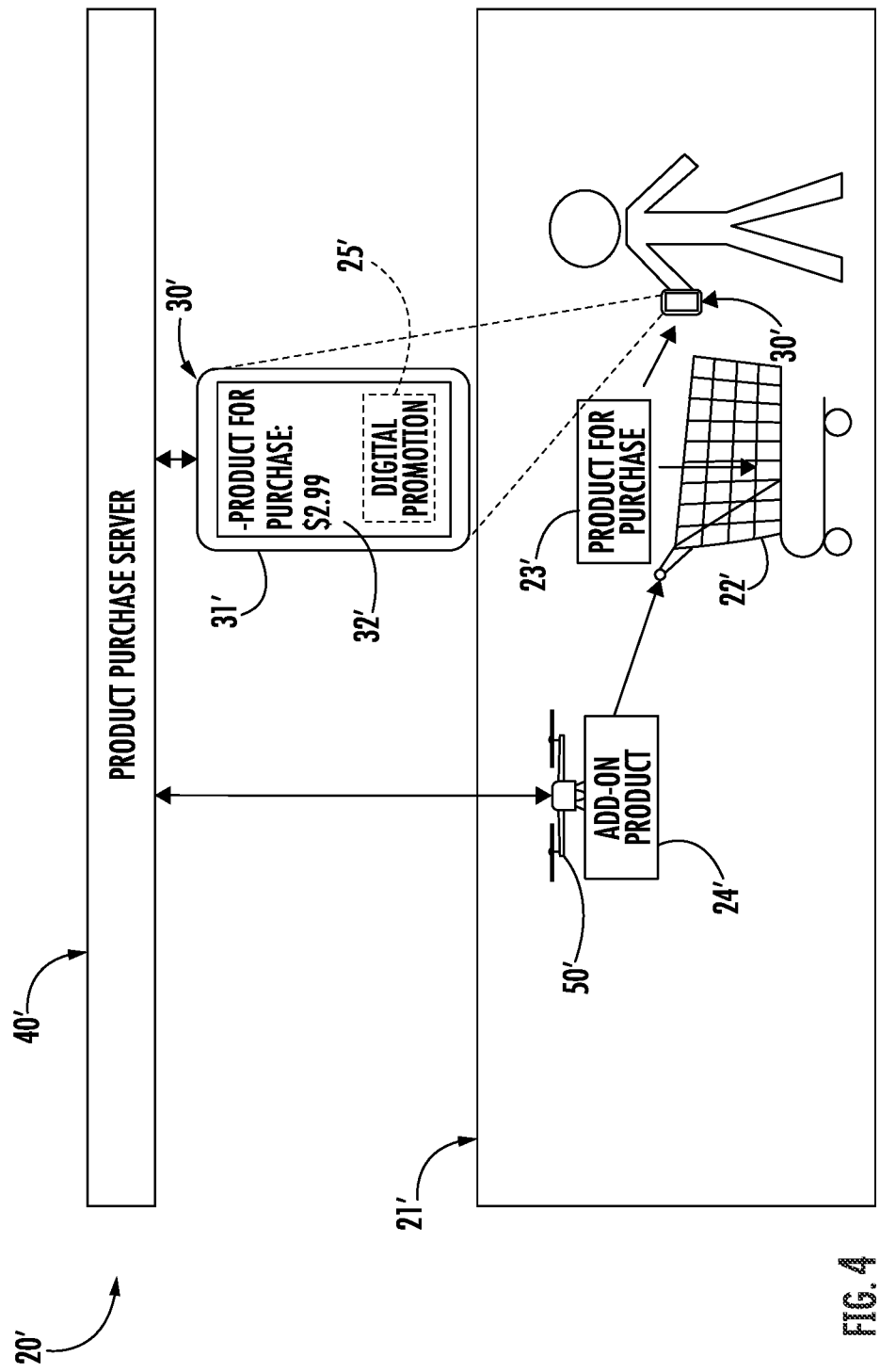
FIG. 4 is a schematic diagram of a product purchase system in accordance with another embodiment.

In some embodiments, for example, as illustrated in FIG. 4, the product retrieval robot 50' may be in the form of a drone or airborne robot. Elements illustrated in FIG. 4, but not specifically described are similar to the elements described herein with respect to the embodiments illustrated in FIGS. 1-2.

At Block 68, the product purchase server 40 cooperates with the product retrieval robot 50, for example, by communicating instructions to the product retrieval robot, to retrieve the add-on product from the physical store 21 and deliver the add-on product to the physical shopping cart 22. In other words, the product retrieval robot 50 locates the add-on product 24 in the physical store 21, retrieves it from the display or shelf, and delivers it to nearby the physical shopping cart or places the add-on product within the physical shopping cart.

The product purchase server 40 may, in some embodiments, generate a digital promotion 25, which may be in the form of a digital promotion or a digital rebate (Block 70). The digital promotion 25 may be for the add-on product 24 or the given product for purchase 23. The product purchase server 40 communicates the digital promotion 25, for example, to the mobile wireless communications device 30 (Block 72). Operations end at Block 74.

In some embodiments, the product purchase system 20 may include a scan check-out device 55 at the physical store 21 that completes the purchase. For example, the given user through the above-described application on the mobile wireless communications device 30, may provide payment for the items in the physical shopping cart 22, while the scan check-out device 55 may be obtain the virtual shopping cart or list for verification. In one exemplary embodiment, upon payment of the items in the physical shopping cart 22, a machine readable code may be displayed on the display 32 of the mobile wireless communications device 30 that may be scanned by the scan check-out device 55 for verification and completion of the purchase transaction.

Figure 5:
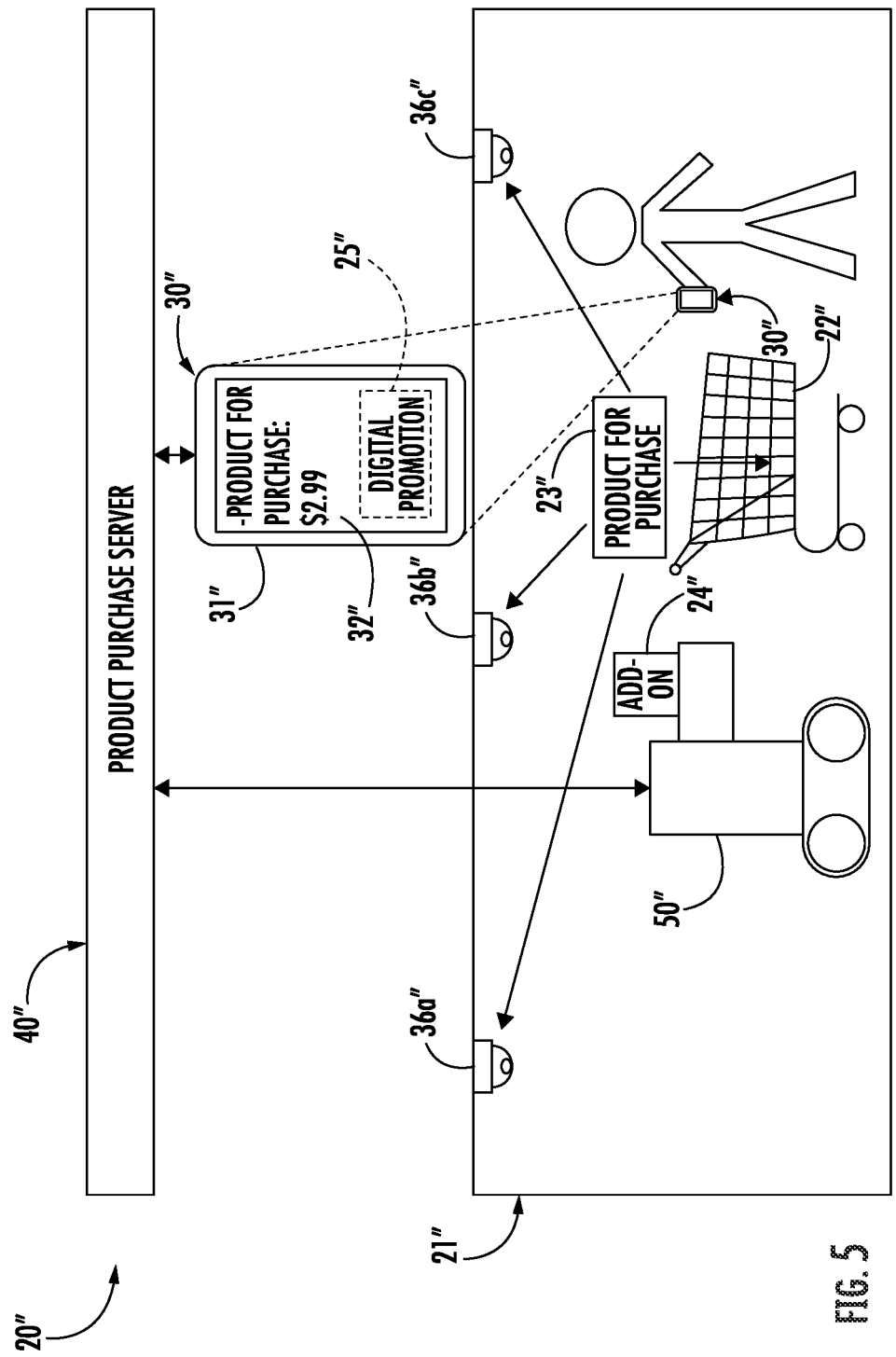
FIG. 5 is a schematic diagram of a product purchase system in accordance with another embodiment.
Figure 6:
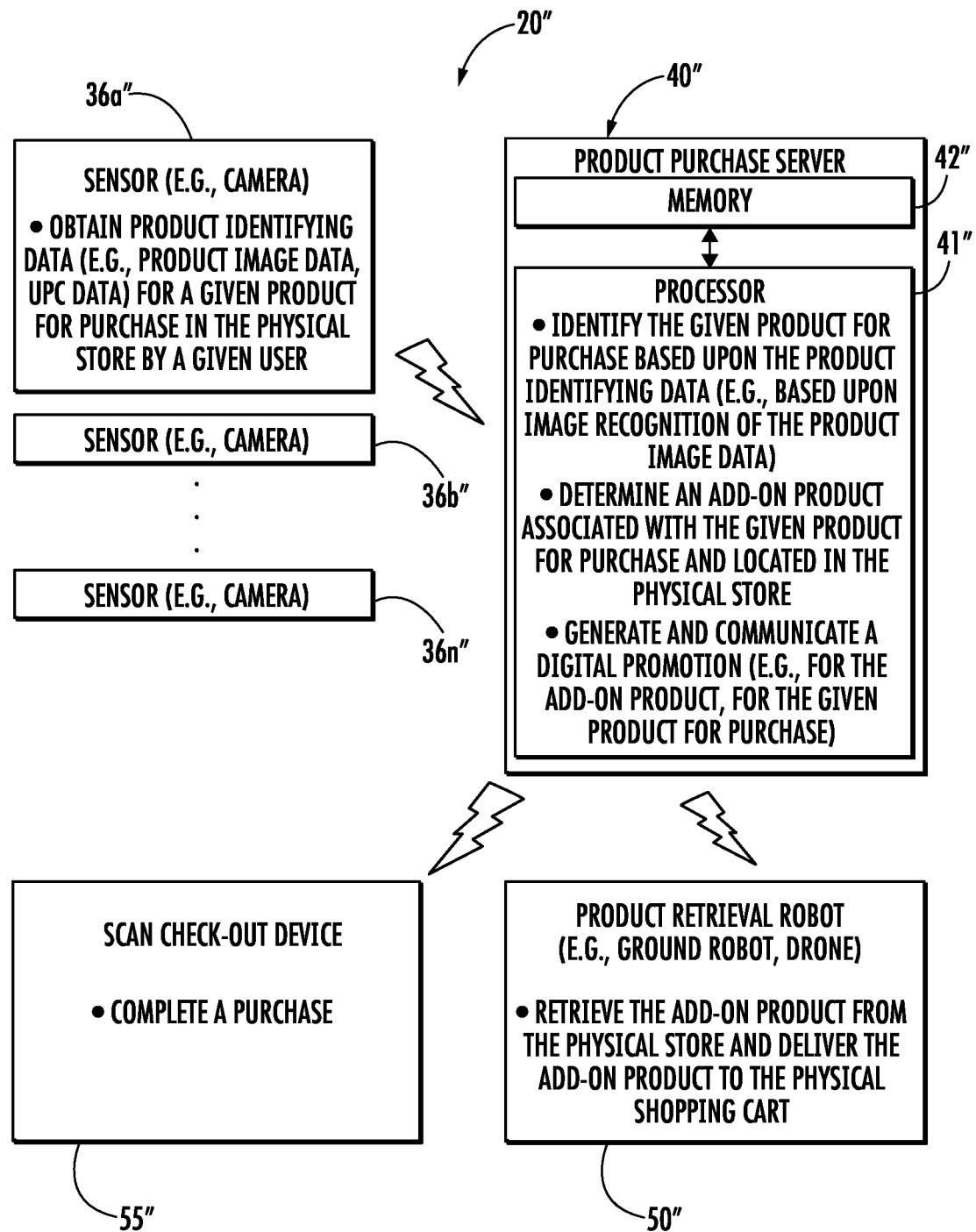
FIG. 6 is a schematic block diagram of the product purchase system of FIG. 5.

Referring now to FIGS. 5-6, in another embodiment, instead of the product identifying data being obtained from a mobile wireless communications device associated with the given user, the product identifying data may be obtained from sensors 36a"-36n". The sensors are illustratively in the form of cameras 36a"-36n". The cameras 36a"-36n" may be spaced apart within the physical store 21". The product identifying data may include product image data that is communicated to the product purchase server 40", which may identify the given product for purchase 23" based upon image recognition of the product image data. In other words, image data obtained from one or more of the cameras 36a"-36n" may be used to determine which product or products for purchase 23" the given user adds to the physical shopping cart 22". Of course, the product identifying data may include other and/or additional types of data as described above, for example, UPC data.

Figure 7:
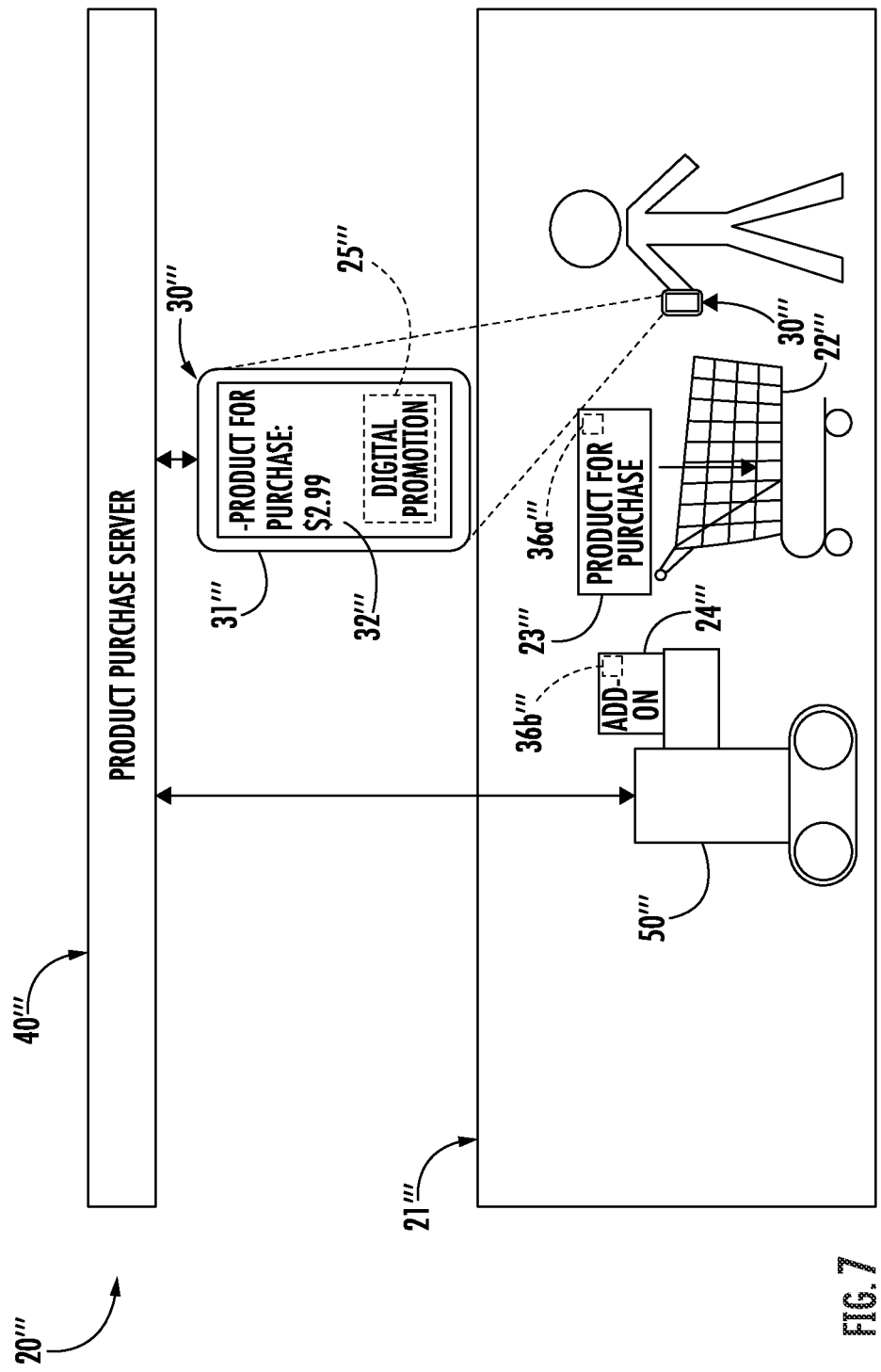
FIG. 7 is a schematic diagram of a product purchase system in accordance with another embodiment.
Figure 8:
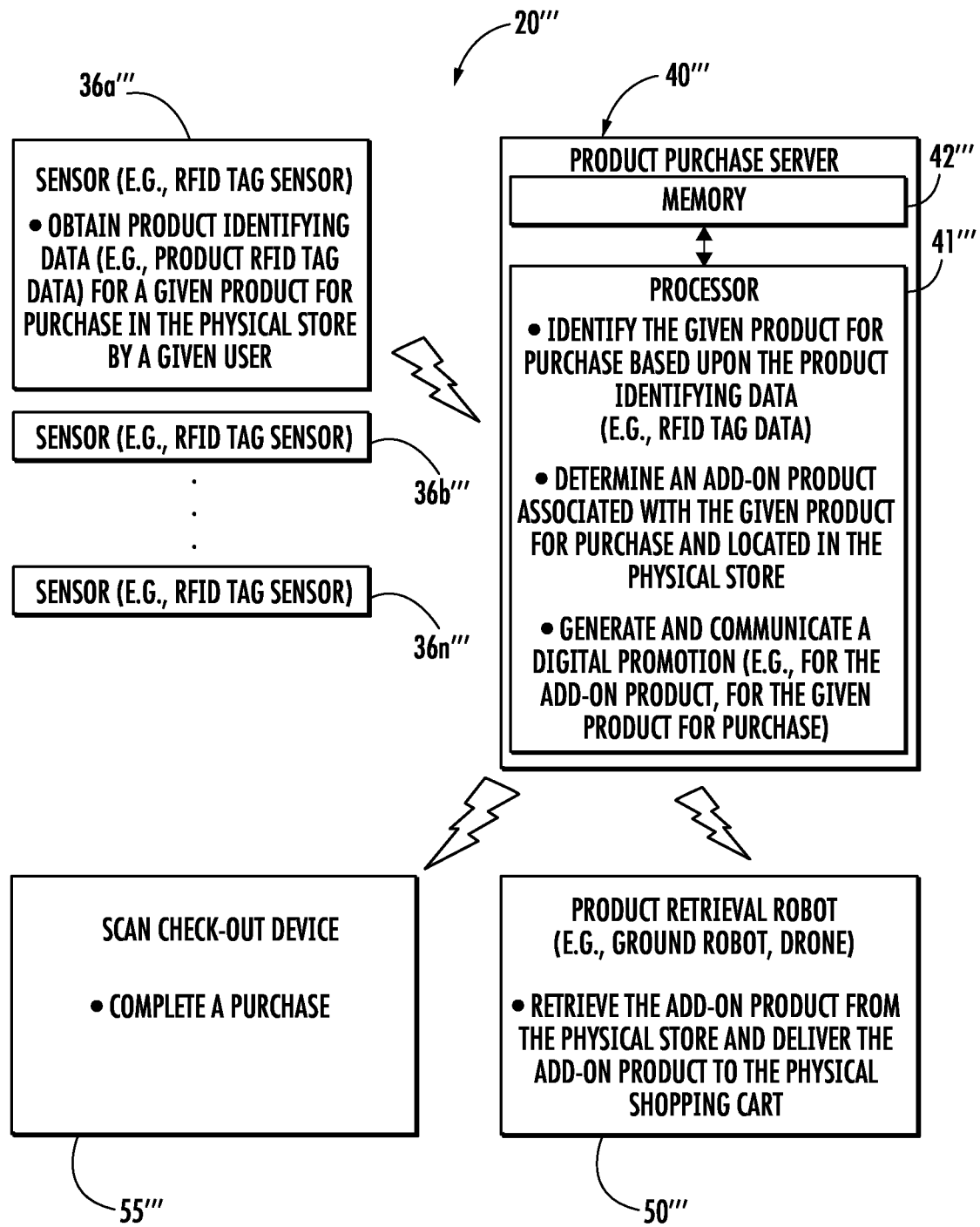
FIG. 8 is a schematic block diagram of the product purchase system of FIG. 7.

Referring briefly to FIGS. 7-8, in another embodiment, the sensors may be in the form of RFID tag sensors 36a"-36n" and the product identifying data may thus include RFID tag data. The RFID tag sensors 36a"-36n" may be carried by products for purchase for example. In some embodiments, the sensors 36a"-36n" may include both cameras and RFID tags. Of course, the sensors 36a"-36n" may include other and/or additional types of sensors.

The product purchase server 40 may associate the given user with the products for purchase 23 being placed in the physical shopping cart 22 based upon proximity of the given user to the physical shopping cart, for example. Facial recognition may be used to identify the user as the image data may include image data or images of the given user. Other techniques for associating the given user may be used, for example, detecting proximity of a mobile wireless communications device associated with the user (e.g., based upon the mobile device identifier).

A method aspect is directed to a method of processing a product purchase. The method may include using a product purchase server 40 to identify a given product for purchase 23 in a physical store 21 based upon product identifying data obtained from a mobile wireless communications device 30 associated with a given user. The given product for purchase 23 may be placed by the given user into a physical shopping cart 22. The method may also include using the processor 41 to determine an add-on product 24 associated with the given product for purchase 23 and located in the physical store 21, and to cooperate with a product retrieval robot 50 in the physical store so that the product retrieval robot retrieves the add-on product from the physical store and delivers the add-on product to the physical shopping cart 22.

Another method aspect is directed to a method of processing a product purchase. The method may include using a processor 41 to identify a given product for purchase 23 in a physical store 21 based upon the product identifying data obtained from a plurality of sensors 30a-30n within the physical store. The given product for purchase 23 may be placed by the given user into a physical shopping cart 22. The method may also include using the processor 41 to determine an add-on product 24 associated with the given product for purchase 23 and located in the physical store 21 and cooperate with a product retrieval robot 50 in the physical store so that the product retrieval robot retrieves the add-on product from the physical store and delivers the add-on product to the physical shopping cart 22.

A computer readable medium aspect is directed to a non-transitory computer readable medium for processing a product purchase. The non-transitory computer readable medium includes computer executable instructions that when executed by a processor 41 cause the processor to perform operations. The operations may include identifying a given product for purchase 23 in a physical store 21 based upon product identifying data obtained from a mobile wireless communications device 30 associated with a given user. The given product for purchase 23 may be placed by the given user into a physical shopping cart 22. The operations may also include determining an add-on product 24 associated with the given product for purchase 23 and located in the physical store 21, and cooperating with a product retrieval robot 50 so that the product retrieval robot retrieves the add-on product from the physical store and delivers the add-on product to the physical shopping cart 22.

Another computer readable medium aspect is directed to a non-transitory computer readable medium for processing a product purchase. The non-transitory computer readable medium includes computer executable instructions that when executed by a processor 41 cause the processor to perform operations. The operations may include identifying a given product for purchase 23 in a physical store 21 based upon the product identifying data obtained from a plurality of sensors 30a-30n within the physical store, the given product for purchase to be placed by the given user into a physical shopping cart 22. The operations may also include determining an add-on product 24 associated with the given product for purchase 23 and located in the physical store 21 and cooperating with a product retrieval robot 50 in the physical store so that the product retrieval robot retrieves the add-on product from the physical store and delivers the add-on product to the physical shopping cart 22.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A product purchase system comprising:
   a product retrieval robot for a physical store;
   a mobile wireless communications device associated with
      a given user and configured to obtain product identifying data for a given product for purchase in the physical store, the given product for purchase to be placed by the given user into a physical shopping cart; and
   a product purchase server configured to
      identify the given product for purchase based upon the product identifying data, and determine an add-on product associated with the given product for purchase and located in the physical store, and associate the given user with the given product for purchase based upon proximity of the mobile wireless communications device to the physical shopping cart;

the product retrieval robot configured to cooperate with the product purchase server to retrieve the add-on product from the physical store and deliver the add-on product to the physical shopping cart based upon the association of the given user to the given product for purchase in the physical shopping cart;

the mobile wireless communications device being configured to process payment for the given product for purchase in the physical shopping cart and the add-on product in the physical shopping cart.

2. The product purchase system of claim 1 wherein said product purchase server is configured to generate and communicate a digital promotion for the add-on product.

3. The product purchase system of claim 1 wherein said product purchase server is configured to generate and communicate a digital promotion for the given product.

4. The product purchase system of claim 1 wherein the product identifying data comprises product image data.

5. The product purchase system of claim 4 wherein the product purchase server is configured to identify the given product for purchase based upon image recognition of the product image data.

6. The product purchase system of claim 1 wherein the product identifying data comprises uniform product code (UPC) data.

7. The product purchase system of claim 1 wherein the product identifying data comprises radio frequency identifying tag data.

8. The product purchase system of claim 1 wherein the product retrieval robot comprises a ground robot.

9. The product purchase system of claim 1 wherein the product retrieval robot comprises a drone.

10. The product purchase system of claim 1 wherein the mobile wireless communications device comprises a camera and a controller cooperating therewith to obtain the product identifying data.

11. The product purchase system of claim 1 comprising a scan check-out device at the physical store configured to verify payment made via the mobile wireless communications device for the given product for purchase and the add-on product to complete the purchase.

12. A product purchase server comprising:

a processor and a memory cooperating therewith and configured to identify a given product for purchase in a physical store based upon product identifying data obtained from a mobile wireless communications device associated with a given user, the given product for purchase to be placed by the given user into a physical shopping cart, determine an add-on product associated with the given product for purchase and located in the physical store, associate the given user with the given product for purchase based upon proximity of the mobile wireless communications device to the physical shopping cart, cooperate with a product retrieval robot in the physical store so that the product retrieval robot retrieves the add-on product from the physical store and delivers the add-on product to the physical shopping cart based upon the association of the given user to the given product for purchase in the physical shopping cart, and cooperate with the mobile wireless communications device to permit the mobile wireless communications device to process payment for the given product for purchase in the physical shopping cart and the add-on product in the physical shopping cart.

13. The product purchase server of claim 12 wherein the processor is configured to generate and communicate a digital promotion for the add-on product.

14. The product purchase server of claim 12 wherein the processor is configured to generate and communicate a digital promotion for the given product.

15. The product purchase server of claim 12 wherein the product identifying data comprises product image data.

16. The product purchase server of claim 12 wherein the product identifying data comprises uniform product code (UPC) data.

17. The product purchase server of claim 12 wherein the product identifying data comprises radio frequency identifying tag data.

18. A method of processing a product purchase comprising:

using a product purchase server to identify a given product for purchase in a physical store based upon product identifying data obtained from a mobile wireless communications device associated with a given user, the given product for purchase to be placed by the given user into a physical shopping cart, determine an add-on product associated with the given product for purchase and located in the physical store, associate the given user with the given product for purchase based upon proximity of the mobile wireless communications device to the physical shopping cart, cooperate with a product retrieval robot in the physical store so that the product retrieval robot retrieves the add-on product from the physical store and delivers the add-on product to the physical shopping cart based upon the association of the given user to the given product for purchase in the physical shopping cart, and cooperate with the mobile wireless communications device to permit the mobile wireless communications device being configured to process payment for the given product for purchase in the physical shopping cart and the add-on product in the physical shopping cart.

19. The method of claim 18 wherein using the processor comprises using the processor to generate and communicate a digital promotion for the add-on product.

20. The method of claim 18 wherein using the processor comprises using the processor to generate and communicate a digital promotion for the given product.

21. The method of claim 18 wherein the product identifying data comprises product image data.

22. The method of claim 18 wherein the product identifying data comprises uniform product code (UPC) data.

23. The method of claim 18 wherein the product identifying data comprises radio frequency identifying tag data.

24. A non-transitory computer readable medium for processing a product purchase, the non-transitory computer readable medium comprising computer executable instructions that when executed by a processor cause the processor to perform operations comprising:

identifying a given product for purchase in a physical store based upon product identifying data obtained from a mobile wireless communications device associated with a given user, the given product for purchase to be placed by the given user into a physical shopping cart;

determining an add-on product associated with the given product for purchase and located in the physical store;

associating the given user with the given product for purchase based upon proximity of the mobile wireless communications device to the physical shopping cart;

cooperating with a product retrieval robot so that the product retrieval robot retrieves the add-on product from the physical store and delivers the add-on product to the physical shopping cart based upon the association of the given user to the given product for purchase in the physical shopping cart; and cooperating with the mobile wireless communications device to permit the mobile wireless communications device being configured to process payment for the given product for purchase in the physical shopping cart and the add-on product in the physical shopping cart.

25. The non-transitory computer readable medium of claim 24 wherein the operations comprise generating and communicating a digital promotion for the add-on product.

26. The non-transitory computer readable medium of claim 24 wherein the operations comprise generating and communicating a digital promotion for the given product.

27. The non-transitory computer readable medium of claim 24 wherein the product identifying data comprises product image data.

28. The non-transitory computer readable medium of claim 24 wherein the product identifying data comprises uniform product code (UPC) data.

29. The non-transitory computer readable medium of claim 24 wherein the product identifying data comprises radio frequency identifying tag data.

\* \* \* \* \*

UNITED STATES PATENT AND TRADEMARK OFFICE
CERTIFICATE OF CORRECTION

PATENT NO. : 11,299,356 B1  
APPLICATION NO. : 16/574430  
DATED : April 12, 2022  
INVENTOR(S) : Bowman et al.

Page 1 of 1

It is certified that error appears in the above-identified patent and that said Letters Patent is hereby corrected as shown below:

In the Claims

Column 6, Lines 63-64    Delete: "; and" after "cart"  
Insert: --,the physical shopping cart being physically separate from the product retrieval robot; and--

Column 8, Line 4    Delete: ", and" after "cart"  
Insert: --,the physical shopping cart being physically separate from the product retrieval robot; and--

Column 9, Line 19    Delete: ", and" after "cart"  
Insert: --,the physical shopping cart being physically separate from the product retrieval robot; and--

Signed and Sealed this  
Twenty-second Day of November, 2022

Katherine Kelly Vidal  
*Director of the United States Patent and Trademark Office*